United States Patent
Aamer

(10) Patent No.: US 9,441,078 B2
(45) Date of Patent: *Sep. 13, 2016

(54) SELF-ASSEMBLING POLYMERS—I

(71) Applicant: PALL CORPORATION, Port Washington, NY (US)

(72) Inventor: Khaled Abdel-Hakim Helmy Aamer, Port Washington, NY (US)

(73) Assignee: Pall Corporation, Port Washington, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/292,376

(22) Filed: May 30, 2014

(65) Prior Publication Data

US 2015/0344639 A1 Dec. 3, 2015

(51) Int. Cl.
*C08F 222/40* (2006.01)
*C08G 81/00* (2006.01)
(Continued)

(52) U.S. Cl.
CPC .............. *C08G 81/00* (2013.01); *B01D 71/62* (2013.01); *B01D 71/64* (2013.01); *B01D 71/80* (2013.01);
(Continued)

(58) Field of Classification Search
CPC ... C08F 222/40; C08F 234/02; C08F 232/08
USPC ............... 526/280, 281, 259, 262, 268, 702
See application file for complete search history.

(56) References Cited

U.S. PATENT DOCUMENTS

| | | |
|---|---|---|
| 3,318,959 A | 5/1967 | Borman |
| 3,625,977 A | 12/1971 | Hamb |

(Continued)

FOREIGN PATENT DOCUMENTS

| | | |
|---|---|---|
| EP | 0 298 408 A1 | 1/1989 |
| EP | 0 430 585 A1 | 6/1989 |

(Continued)

OTHER PUBLICATIONS

Adams, M. "Investigation of microphase separated dicarboxyimide-functionalized oxanorbornyl diblock copolymers exhibiting nanostructure." Abstracts of Papers, 247th ACS National Meeting & Exposition, Dallas, TX, Mar. 16, 2014.*

(Continued)

*Primary Examiner* — Rip A Lee
(74) *Attorney, Agent, or Firm* — Leydig, Voit & Mayer, Ltd.

(57) ABSTRACT

Disclosed are self-assembling diblock copolymers of the formula (I):

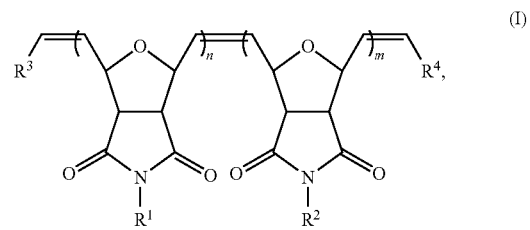

wherein $R^1$-$R^4$, n, and m are as described herein, which find use in preparing porous membranes. Embodiments of the membranes contain the diblock copolymer self-assembled into a cylindrical morphology. Also disclosed is a method of preparing such copolymers.

20 Claims, 2 Drawing Sheets

(51) Int. Cl.
*B01D 71/64* (2006.01)
*C08J 5/22* (2006.01)
*C08G 61/12* (2006.01)
*B01D 71/62* (2006.01)
*B01D 71/80* (2006.01)

(52) U.S. Cl.
CPC .............. *C08G 61/12* (2013.01); *C08J 5/2256* (2013.01); *C08F 222/40* (2013.01); *C08G 2261/126* (2013.01); *C08G 2261/148* (2013.01); *C08G 2261/1412* (2013.01); *C08G 2261/3342* (2013.01); *C08G 2261/418* (2013.01); *C08G 2261/614* (2013.01)

(56) References Cited

U.S. PATENT DOCUMENTS

| | | |
|---|---|---|
| 3,847,867 A | 11/1974 | Heath et al. |
| 4,242,384 A | 12/1980 | Andrew et al. |
| 4,611,048 A | 9/1986 | Peters |
| 4,698,388 A | 10/1987 | Ohmura et al. |
| 4,725,441 A | 2/1988 | Porter et al. |
| 4,945,135 A | 7/1990 | Grubbs et al. |
| 4,948,508 A | 8/1990 | Nakagawa et al. |
| 4,954,256 A | 9/1990 | Degen et al. |
| 4,965,330 A | 10/1990 | Asrar |
| 5,191,026 A | 3/1993 | Nishi et al. |
| 5,198,554 A | 3/1993 | Inagaki et al. |
| 5,202,388 A | 4/1993 | Iio et al. |
| 5,282,965 A | 2/1994 | Urairi et al. |
| 5,286,382 A | 2/1994 | Scarmoutzos et al. |
| 5,462,867 A | 10/1995 | Azad et al. |
| 5,580,934 A | 12/1996 | Nishi et al. |
| 5,599,882 A | 2/1997 | Nishi et al. |
| 5,824,049 A | 10/1998 | Ragheb et al. |
| 5,911,880 A | 6/1999 | Klein et al. |
| 5,969,170 A | 10/1999 | Grubbs et al. |
| 5,976,380 A | 11/1999 | Moya |
| 5,998,326 A | 12/1999 | Hafner et al. |
| 6,039,872 A | 3/2000 | Wu et al. |
| 6,096,070 A | 8/2000 | Ragheb et al. |
| 6,111,121 A | 8/2000 | Grubbs et al. |
| 6,126,825 A | 10/2000 | Shinagawa et al. |
| 6,214,936 B1 | 4/2001 | Mehler et al. |
| 6,354,443 B1 | 3/2002 | Moya |
| 6,420,503 B1 | 7/2002 | Jayaraman et al. |
| 6,486,264 B1* | 11/2002 | Tsunogae et al. ............ 525/339 |
| 6,669,980 B2 | 12/2003 | Hansen |
| 6,734,386 B1 | 5/2004 | Lauterbach et al. |
| 6,759,537 B2 | 7/2004 | Grubbs et al. |
| 6,846,890 B2 | 1/2005 | Miyaki et al. |
| 6,867,303 B2 | 3/2005 | Grela |
| 6,921,735 B2 | 7/2005 | Hoveyda et al. |
| 7,037,993 B2 | 5/2006 | Taguchi et al. |
| 7,230,066 B2 | 6/2007 | Khouri et al. |
| 7,284,668 B2 | 10/2007 | Charkoudian |
| 7,300,022 B2 | 11/2007 | Muller |
| 7,329,758 B1 | 2/2008 | Grubbs et al. |
| 7,332,609 B2* | 2/2008 | Emrick et al. ............... 548/103 |
| 7,378,528 B2 | 5/2008 | Herrmann et al. |
| 7,611,629 B2 | 11/2009 | Doucoure et al. |
| 7,628,917 B2 | 12/2009 | Penezina et al. |
| 7,717,273 B2 | 5/2010 | Kozlov et al. |
| 7,750,103 B2 | 7/2010 | Emrick et al. |
| 7,960,555 B2* | 6/2011 | Emrick ........................ 548/103 |
| 8,048,963 B2 | 11/2011 | Fuller et al. |
| 8,049,025 B2 | 11/2011 | Zhan |
| 8,053,531 B2 | 11/2011 | Hirata et al. |
| 8,153,739 B2* | 4/2012 | Tew et al. ..................... 526/256 |
| 8,223,472 B1 | 7/2012 | Dirk et al. |
| 8,232,360 B2 | 7/2012 | Sampson et al. |
| 8,277,914 B2 | 10/2012 | Ogawa et al. |
| 8,283,410 B2 | 10/2012 | Musa |
| 8,329,927 B2 | 12/2012 | Tew et al. |
| 8,420,704 B2 | 4/2013 | Hillmyer et al. |
| 8,440,765 B2 | 5/2013 | Balsara et al. |
| 8,535,590 B2 | 9/2013 | Milner et al. |
| 8,647,730 B2 | 2/2014 | Kudo et al. |
| 2001/0021764 A1 | 9/2001 | Weisse et al. |
| 2002/0040109 A1 | 4/2002 | Fogg et al. |
| 2003/0064884 A1 | 4/2003 | Yao |
| 2005/0176893 A1 | 8/2005 | Rana et al. |
| 2007/0238853 A1 | 10/2007 | Hay et al. |
| 2008/0103256 A1 | 5/2008 | Kim et al. |
| 2009/0082524 A1 | 3/2009 | Tew et al. |
| 2009/0127186 A1 | 5/2009 | Mizomoto et al. |
| 2009/0173694 A1 | 7/2009 | Peinemann et al. |
| 2009/0233236 A1 | 9/2009 | Black et al. |
| 2009/0236309 A1 | 9/2009 | Millward et al. |
| 2009/0263725 A1 | 10/2009 | Balsara et al. |
| 2010/0230351 A1 | 9/2010 | Hoving et al. |
| 2011/0120970 A1 | 5/2011 | Joo et al. |
| 2011/0206880 A1 | 8/2011 | Wang et al. |
| 2012/0041137 A1* | 2/2012 | Musa et al. .................. 524/548 |
| 2012/0077893 A1 | 3/2012 | Hood |
| 2013/0041055 A1 | 2/2013 | Hillmyer et al. |
| 2013/0165661 A1 | 6/2013 | Grubbs et al. |
| 2013/0189504 A1 | 7/2013 | Nealey et al. |
| 2013/0280237 A1 | 10/2013 | Tew et al. |
| 2014/0011958 A1 | 1/2014 | Miyake et al. |

FOREIGN PATENT DOCUMENTS

| | | |
|---|---|---|
| EP | 0 409 291 A2 | 1/1991 |
| EP | 0 713 893 A1 | 5/1996 |
| EP | 0 784 066 A1 | 7/1997 |
| EP | 0 922 486 A1 | 6/1999 |
| EP | 0 968 758 A2 | 1/2000 |
| EP | 1 238 996 A1 | 9/2002 |
| EP | 1 408 064 A1 | 4/2004 |
| EP | 1 783 149 A1 | 5/2007 |
| EP | 1 903 074 A1 | 3/2008 |
| EP | 2 639 247 A1 | 9/2013 |
| JP | S51-151275 A | 12/1976 |
| JP | S52-122278 A | 10/1977 |
| JP | 2009-209324 A | 9/2009 |
| JP | 2010-155919 A | 7/2010 |
| KR | 1020090089041 A | 8/2009 |
| WO | WO 99/47570 A1 | 9/1999 |
| WO | WO 01/61042 A2 | 8/2001 |
| WO | WO 02/072659 A1 | 9/2002 |
| WO | WO 2004/009605 A2 | 1/2004 |
| WO | WO 2006/130955 A1 | 12/2006 |
| WO | WO 2009/001724 A1 | 12/2008 |
| WO | 2009/039407 A1 | 3/2009 |
| WO | WO 2010/101882 A1 | 9/2010 |
| WO | WO 2011/112796 A1 | 9/2011 |
| WO | WO 2011/140158 A1 | 11/2011 |
| WO | WO 2013/028308 A1 | 2/2013 |
| WO | WO 2013/097570 A1 | 7/2013 |
| WO | WO 2013-137398 A1 | 9/2013 |

OTHER PUBLICATIONS

çetinkaya, S.; Buyun, P.H.K. Synthetic Metals 2013, 180, 59-63.*
Matson, J.B.; Grubbs, R.H. Macromolecules 2008, 41, 5626-5631.*
U.S. Appl. No. 14/292,640, filed May 30, 2014.
U.S. Appl. No. 14/292,710, filed May 30, 2014.
U.S. Appl. No. 14/292,611, filed May 30, 2014.
U.S. Appl. No. 14/292,665, filed May 30, 2014.
U.S. Appl. No. 14/292,446, filed May 30, 2014.
U.S. Appl. No. 14/292,722, filed May 30, 2014.
U.S. Appl. No. 14/292,580, filed May 30, 2014.
U.S. Appl. No. 14/292,531, filed May 30, 2014.
U.S. Appl. No. 14/292,255, filed May 30, 2014.
U.S. Appl. No. 14/292,739, filed May 30, 2014.
U.S. Appl. No. 14/292,193, filed May 30, 2014.
U.S. Appl. No. 14/292,751, filed May 30, 2014.
U.S. Appl. No. 14/292,320, filed May 30, 2014.
U.S. Appl. No. 14/645,633, filed Mar. 12, 2015.
U.S. Appl. No. 14/645,615, filed Mar. 12, 2015.
Adams, Marisa et al., "investigation of microphase separated dicarboximide-functionalized oxanorbornyl diblock copolymers

(56) References Cited

OTHER PUBLICATIONS exhibiting nanostructure," Abstracts of Papers, 247th ACS National Meeting & Exposition, Dallas, TX, United States, Mar. 16-20, 2014.
Asif, A. et al., "Hydroxyl terminated poly(ether ether ketone) with pendant methyl group-toughened epoxy clay ternary nanocomposites: Preparation, morphology, and thermomechanical properties," *Journal of Applied Polymer Science*, vol. 106, No. 5, pp. 2936-2946 (Dec. 5, 2007) (Abstract).
Bang, Joona et al., "Defect-Free Nanoporous Thin Films from ABC Copolymers," *Journal of the American Chemical Society*, vol. 128, pp. 7622-7629 (2006).
"Spin Coat Theory," Brewer Science, Inc., http://www.brewerscience.com/research/processing-theory/spin-coating-theory, downloaded Jun. 30, 2014 (no original publication or copyright date available).
Francis, Bejoy et al., "Synthesis of hydroxyl-terminated poly(ether ether ketone) with pendent *tert*-butyl groups and its use as a toughener for epoxy resins," *Journal of Polymer Science Part B: Polymer Physics*, vol. 44, No. 3, pp. 541-556 (Feb. 1, 2006) (Abstract).
Girotto, Claudio et al., "Spray coating for fabricating polymer-based organic solar cells," *Global Solar Technology*, pp. 10-13 (Mar. 2010).
Guillen, Gregory R. et al., "Preparation and Characterization of Membranes Formed by Nonsolvent Induced Phase Separation: A Review," *Industrial & Engineering Chemistry Research*, vol. 50, pp. 3798-3817 (2011).
Hahn et al., "Structure Formation of Integral-Asymmetric Membrane Polstyrene-block-Poly(ethylene oxide)," *J. Polym. Sci. B Polym. Phys.*, 51: 281-290 (2013).
Hall, David B. et al., "Spin Coating of Thin and Ultrathin Polymer Films," *Polymer Engineering and Science*, vol. 38, No. 12, pp. 2039-2045 (Dec. 1998).
Hollister, Adrienne et al., "Synthesis and physical properties of dicarboximide-functionalized oxanorbornyl polymers," Abstracts of Papers, 241st ACS National Meeting & Exposition, Anaheim, CA, United States, Mar. 27-31, 2011.
Hollister, Adrienne et al., "Towards novel thin-film polymer blends: Synthesis and characterization of norbornene related homopolymers and diblock copolymers via ring opening metathesis polymerization," Abstracts of Papers, 239th ACS National Meeting, San Francisco, CA, United States, Mar. 21-25, 2010.
Ledoux, Nele, "Ruthenium Olefin Metathesis Catalysts: Tuning of the Ligand Environment," *Universiteit Gent*, pp. 1-198 (2007).
Li, Li, "Nanoporous Polymers for Membrane Applications," Ph.D. Thesis, DTU Chemical Engineering, pp. 1-180 (Jan. 2012).
Love, Jennifer A. et al., "A Practical and Highly Active Ruthenium-Based Catalyst that Effects the Cross Metathesis of Acrylonitrile," *Angewandte Chemie*, vol. 41, No. 21, pp. 4035-4037 (2002).
Lu, Hua e al., "One-Pot Synthesis of Brush-Like Polymers via integrated Ring-Opening Metathesis Polymerization and Polymerization of Amino Acid N-Carboxyanhydrides," *Journal of the American Chemical Society*, vol. 131, pp. 13582-13583 (2009).
Mulder, M., "Phase inversion Membranes," *Membrane Preparation: Phase Inversion Membranes*, pp. 3331-3346 (2000).
Oss-Ronen, Liat et al., "Characterization of Block Copolymer Self-Assembly: From Solution to Nanoporous Membranes," *Macromolecules*, vol. 45, pp. 9631-9642 (2012).
Park, Miri et al., "Block Copolymer Lithography: Periodic Arrays of ~$10^{11}$ Holes in 1 Square Centimeter," *Science*, vol. 276, pp. 1401-1404 (May 30, 1997).
Peinemann, Klaus-Viktor et al "Asymmetric superstructure formed in a block copolymer via phase separation," *Nature Materials*, vol. 6, pp. 992-996 (Dec. 2007).
Posselt, Kyle et al., "Synthesis and characterization of dicarboximide-functionalized oxanorbornyl homopolymer and diblock copolymers," Abstracts of Papers 243rd ACS National Meeting & Exposition, San Diego, CA, United States, Mar. 25-29, 2012.

Richmond, Victoria et al., "Synthesis and characterization of dicarboximide- functionalized oxanorbornyl homopolymers with ethylene oxide side chains," Abstracts of Papers, 247th ACS National Meeting & Exposition, Dallas, TX, United States, Mar. 16-20, 2014.
Riffle, J.S. et al., "Synthesis of hydroxyl-terminated polycarbonates of controlled number—average molecular weight" *Journal of Polymer Science: Polymer Chemistry Edition*, vol. 20, No. 8, pp. 2289-2301 (Aug. 1982) (Abstract).
Sahu, Niranjan et al., "Fundamental understanding and modeling of spin coating process: A review," *Indian Journal of Physics*, vol. 83, No. 4, pp. 493-502 (2009).
Sommer, William, "Olefin Metathesis," Sigma-Aldrich Chemical Co., Inc., *ChemFiles*, vol. 9, No. 6, pp. 3-11 (2009).
Srinivasan, Siddarth et al., "Solution Spraying of Poly(methyl methacrylate) Blends to Fabricate Micro-textured, Superoleophobic Surfaces," Manuscript (downloaded May 19, 2014).
Thurn-Albrecht, Thomas et al., "Nanoscopic Templates from Oriented Block Copolymer Films," *Advanced Materials*, vol. 12, No. 11, pp. 787-791 (2000).
Walhehvi, Stefan et al, "Structure Formation via Polymer Demixing in Spin-Cast Films," *Macromolecules*, vol. 30, pp. 4995-5003 (1997).
"Polyester ether ketone (PEEK)," Wikipedia, http://en.wikipedia.org/wiki/PEEK, downloaded Jun. 11, 2014.
Yang, Yong-qiang et al., "Preparation of PPESK Hollow Fiber Asymmetric Nanofiltration Membrane," *The Proceedings of the 3rd International Conference on Functional Molecules*, pp. 295-296 (May/Jun. 2011).
Yun, Yanbin et al, "Preparation of an Ultrafiltration Membrane from Poly(Phthalazine Ether Sulfone Ketone)," *Integrated Concepts in Water Recycling*, pp. 741-752 (2005).
Zhang, Yanfeng et al., "PEG-Polypeptide Dual Brush Block Copolymers: Synthesis and Application in Nanoparticle Surface PEGylation," *ACS Macro Letters*, vol. 2, pp. 809-813 (2013).
çetinkaya et al., "Preparation of a new nanoconductive ROMP copolymer and its application as solid polymer electrolyte," *Synthetic Metals*, vol. 180, pp. 59-63 (2013).
Dalphond et al., "Synthesis and Self-Assembly of Polymers Containing Dicarboximide Groups by Living Ring-Opening Metathesis Polymerization," *Macromol. Chem. Phys.*, vol. 203, pp. 1988-1994 (2002).
Love et al., "A Practical and Highly Active Ruthenium-Based Catalyst that Effects the Cross Metathesis of Acrylonitrile," *Agnew. Chem. Int. Ed.*, vol. 41, No. 21, pp. 4035-4037 (2002).
Metera et al., "Luminescent Iridium(III)-Containing Block Copolymers: Self-Assembly into Biotin-Labeled Micelles for Biodetection Assays," *ACS Macro Letters*, vol. 1, pp. 954-959 (2012).
Runge et al., "Synthesis of Tri- and Tetrablock Copolymers Catalyzed by the Grubbs First Generation Catalyst," *Macromolecular Rapid Communications*, vol. 30, pp. 1392-1398 (2009).
Sankaran et ai, "Ring-Opening Metathesis Polymers for Biodetection and Signal Amplification: Synthesis and Self-Assembly," *Macromolecules*, vol. 43, pp. 5530-5537 (2010).
Vargas et al., "Synthesis and ring-opening metathesis polymerization (ROMP) of new *N*-fluoro-phenylnorbornene dicarboximides by $2^{nd}$ generation ruthenium alkylidene catalysts," *eXPRESS Polymer Letters*, vol. 1, No. 5, pp. 274-282 (2007).
Zha et al., "Magnetic Properties of Cobalt-Containing Diblock Copolymers with Cylindrical Morphology of Different Domain Sizes," *J. Inorg. Organomet. Polym.*, No. 23, pp. 89-94 (2013).
European Patent Office, Extended European Search Report in European Patent Application No. 15 16 0489 (Jun. 5, 2015).
Japanese Patent Office, Office Action mailed Feb. 9, 2016 in Japanese Patent Application No. 2015-062984.
Bazzi et al., "Adenine-Containing Block Copolymers via Ring-Opening Metathesis Polymerization: Synthesis and Self-Assembly into Rod Morphologies," *Macromolecules*, vol. 35, pp. 9617-9620 (2002).
Binder et al., "Directed Nanoparticle Binding onto Microphase-Separated Block Copolymer Thin Films," *Macromolecules*, vol. 38, pp. 9405-9410 (2005).

(56) References Cited

OTHER PUBLICATIONS

Matson et al., "Pulsed-Addition Ring-Opening Metathesis Polymerization: Catalyst-Economical Syntheses of Homopolymers and Block Copolymers," *Journal of American Chemical Society*, vol. 131, pp. 3355-3362 (2003).

Breitenkamp et al., "Rapid communication, Amphiphilic Ruthenium Benzylidene Metathesis Catalyst with PEG-substituted Pyridine Ligands," Journal of Polymer Science: Part A: Polymer Chemistry, vol. 43, pp. 5715-5721 (2005).

çetinkaya et al., "Synethesis of high-T g polymers via ROMP of oxanorbornene dicarboximides with halogen groups," Heteroatom Chemistry, vol. 21, No. 1 (Jan. 1, 2010).

Chen B. et al., "Ruthenium Bipyridine-Containing Polymers and Block Copolymers via Ring-Opening Metathesis Polymerization," Macromolecules, vol. 37, pp. 5866-5872 (2004).

Dimitriou et al., "Amphiphilic block copolymer surface composition: Effects of spin coating versus spray coating," Polymer, vol. 53(6), pp. 1321-1327 (Dec. 26, 2011).

Dirk et al., "High temperature polymer dielectrics from the ring opening metathesis polymerization (ROMP)," Pulsed Power Conference 2009 (PPC '09), IEEE, Piscataway, New Jersey, pp. 332-335 (Jun. 28, 2009).

Kluger et al., "Functionalized Poly(oxabornene)-Block-Copolymers: Preparation via Romp/Click-Methodology," Journal of Polymer Science: Part A: Polymer Chemistry, vol. 45, pp. 485-499 (2007).

McLaughlin et al., "Three-Dimensional Organization of Block Copolymers on 'DNA-Minimal' Scaffolds," Journal of the American Chemical Society, vol. 134, pp. 4280-4286 (2012)

Runge et al., "Synthesis of High Molecular Weight Comb Block Copolymers and Their Assembly into Orders Morphologies in the Solid State," J. of Am. Chem. Soc., 129(34), pp. 10551-10560 (2007)

Samanta et al., "A Synthesis of PEG- and Phosphorylcholine-Substituted Pyridines To Afford Water-Soluble Ruthenium Benzylidene Metathesis Catalysts", Macromolecules, vol. 41, pp. 530-532 (2008).

Samanta et al., "Click chemistry to give pegylated pyridine and water soluble Ruthenium benzylidene catalysts," Polymer Preprints, vol. 49, No. 1, p. 150 (2008).

Singh et al., "A review on membrane fabrication: Structure, properties and performance relationship," Desalination, vol. 326, pp. 77-95 (Aug. 16, 2013).

Tlenkopatchev et al.: "Gas Transport in Polymers Prepared via Metathesis Copolymerization of exo-N-Phenyl-7-oxanorbornene-5,6-dicarboximide and Norbornene", Macromolecules, vol. 36, pp. 8483-8488 (2003).

Vargas et al.: "Gas transport in membranes based on polynorbornenes with fluorinated dicarboximide side moieties," Journal of Membrane Science, vol. 361, pp. 78-88 (2010).

Vargas et al.: "Ring-opening metathesis polymerization (ROMP) of N-cycloalkyl-7-oxanorbornene dicarboximides by well-defined ruthenium initiators," European Polymer Journal, vol. 40, pp. 1325-1335 (2004).

Wu et al., "Design and Preparation of Porous Polymers," Chemical Reviews, vol. 112(7), pp. 3959-4015 (Jul. 11, 2012).

Yoon et al., "Synthesis and Structure-Property Comparisons of Hydrogenated Poly(oxanorbornene-imide)s and Poly(norbornene-imide)s Prepared by Ring-Opening metathesis Polymerization," Journal of Polymer Science Part A: Polymer Chemistry, vol. 50, pp. 3914-3921 (2012).

Hardy et al., "Metallopolymers with transition metals in the side-chain by living and controlled polymerization techniques", *Progress in Polymer Science*, vol. 39, pp. 1742-1796 (Available Online Apr. 1, 2014).

Korean Intellectual Property Office, Notice of Non-Final Rejection in Korean Patent Application No. 10-2015-0044035 (Feb. 20, 2016).

Canadian Intellectual Property Office, Office Action in Canadian Patent Application No. 2,886,288 (Apr. 25, 2016).

Intellectual Property Office of Singapore, Office Action in Singapore Patent Application No. 10201502448T (Jun. 29, 2016).

* cited by examiner

SELF-ASSEMBLING POLYMERS—I

BACKGROUND OF THE INVENTION

Polymers, in particular block copolymers, which self-assemble into nanostructures have been proposed for use in a number of applications including filtration membranes, pervaporation membranes, lithography, solid state polymer electrolytes, ion exchange membranes, and biomaterials. For example, diblock copolymers when dissolved in selective solvents self-assemble into spherical or cylindrical micelles, vesicles and other structures. However, challenges remain in obtaining well defined nanostructures. The foregoing indicates that there is an unmet need for block copolymers that self-assemble under appropriate processing conditions to provide well defined nanostructures.

BRIEF SUMMARY OF THE INVENTION

The invention provides a diblock copolymer of the formula (I):

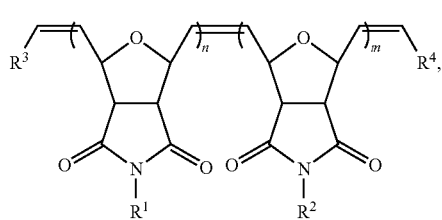

wherein:
$R^1$ is a $C_1$-$C_{22}$ alkyl group optionally substituted with a substituent selected from halo, alkoxy, alkylcarbonyl, alkoxycarbonyl, amido, and nitro, or a $C_3$-$C_{11}$ cycloalkyl group, optionally substituted with a substituent selected from alkyl, halo, alkoxy, alkylcarbonyl, alkoxycarbonyl, amido, and nitro;

$R^2$ is a $C_6$-$C_{20}$ aryl group or a heteroaryl group, optionally substituted with a substituent selected from hydroxy, nitro, amino, halo, alkoxy, alkylcarbonyl, alkoxycarbonyl, amido, and nitro;

one of $R^3$ and $R^4$ is a $C_6$-$C_{14}$ aryl group, optionally substituted with a substituent selected from hydroxy, halo, amino, and nitro, and the other of $R^3$ and $R^4$ is a $C_1$-$C_{22}$ alkoxy group, optionally substituted with a substituent selected from carboxy, amino, mercapto, alkynyl, alkenyl, halo, azido, and heterocyclyl;

n and m are independently 2 to about 2000.

The invention also provides a process for preparing the diblock copolymer of formula (I) and also porous membranes prepared from the diblock copolymers.

DETAILED DESCRIPTION OF THE INVENTION

Figure 1:
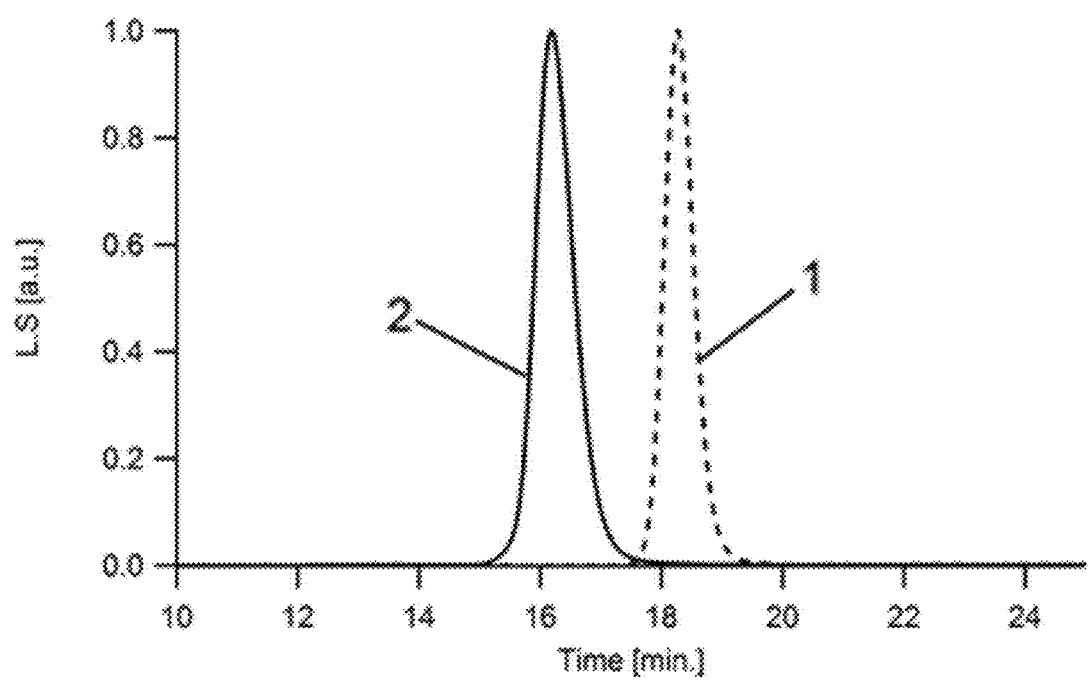
FIG. 1 depicts overlaid traces of the Multi-angle Laser Light Scattering (MALS) gel permeation chromatograms (GPC) of a homopolymer 1 (a precursor to the diblock copolymer) and a diblock copolymer 2 in accordance with an embodiment of the invention.

In an embodiment, the invention provides a diblock copolymer of the formula (I):

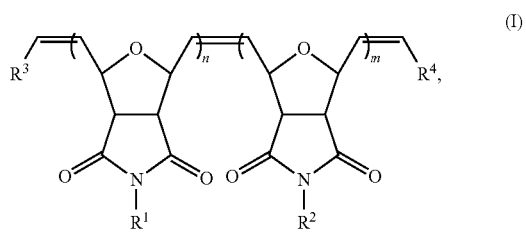

wherein:
$R^1$ is a $C_1$-$C_{22}$ alkyl group optionally substituted with a substituent selected from halo, alkoxy, alkylcarbonyl, alkoxycarbonyl, amido, and nitro, or a $C_3$-$C_{11}$ cycloalkyl group, optionally substituted with a substituent selected from alkyl, halo, alkoxy, alkylcarbonyl, alkoxycarbonyl, amido, and nitro;

$R^2$ is a $C_6$-$C_{20}$ aryl group or a heteroaryl group, optionally substituted with a substituent selected from hydroxy, nitro, amino, halo, alkoxy, alkylcarbonyl, alkoxycarbonyl, amido, and nitro;

one of $R^3$ and $R^4$ is a $C_6$-$C_{14}$ aryl group, optionally substituted with a substituent selected from hydroxy, halo, amino, and nitro, and the other of $R^3$ and $R^4$ is a $C_1$-$C_{22}$ alkoxy group, optionally substituted with a substituent selected from carboxy, amino, mercapto, alkynyl, alkenyl, halo, azido, and heterocyclyl;

n and m are independently 2 to about 2000.

In accordance with an embodiment, the invention provides a diblock copolymer of the formula (Ia), wherein the monomers are exo isomers:

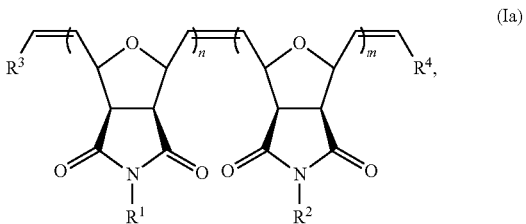

In any of the embodiments above, $R^1$ is a $C_6$-$C_{20}$ alkyl group optionally substituted with a substituent selected from halo, alkoxy, alkylcarbonyl, alkoxycarbonyl, amido, and nitro, or a $C_3$-$C_{11}$ cycloalkyl group, optionally substituted with a substituent selected from alkyl, halo, alkoxy, alkylcarbonyl, alkoxycarbonyl, amido, and nitro.

In an embodiment, $R^1$ is a $C_{10}$-$C_{18}$ alkyl group, optionally substituted with a substituent selected from halo, alkoxy, alkylcarbonyl, alkoxycarbonyl, amido, and nitro.

In a particular embodiment, $R^1$ is a $C_{16}$ alkyl group.

In any of the embodiments above, $R^2$ is a $C_6$-$C_{10}$ aryl group, optionally substituted with a substituent selected from hydroxy, nitro, amino, halo, alkoxy, alkylcarbonyl, alkoxycarbonyl, amido, and nitro.

In an embodiment, $R^2$ is a phenyl group, optionally substituted with a substituent selected from hydroxy, nitro, amino, halo, alkoxy, alkylcarbonyl, alkoxycarbonyl, amido, and nitro.

In any of the embodiments above, $R^3$ is a $C_6$-$C_{14}$ aryl group, optionally substituted with a substituent selected from hydroxy, halo, amino, and nitro and $R^4$ is a $C_1$-$C_{22}$ alkoxy group, optionally substituted with a substituent selected from carboxy, amino, mercapto, alkynyl, alkenyl, halo, azido, and heterocyclyl.

In an embodiment, $R^3$ is phenyl, optionally substituted with a substituent selected from hydroxy, halo, amino, and nitro and $R^4$ is a $C_1$-$C_6$ alkoxy group, optionally substituted with a substituent selected from carboxy, amino, mercapto, alkynyl, alkenyl, halo, azido, and heterocyclyl.

In an embodiment, $R^3$ is provided by the ROMP catalyst employed for the polymerization of the monomers.

In an embodiment, $R^4$ is a group provided by the vinyl ether compound employed for terminating the polymerization.

In accordance with the invention, the term "aryl" refers to a mono, bi, or tricyclic carbocyclic ring system having one, two, or three aromatic rings, for example, phenyl, naphthyl, anthracenyl, or biphenyl. The term "aryl" refers to an unsubstituted or substituted aromatic carbocyclic moiety, as commonly understood in the art, and includes monocyclic and polycyclic aromatics such as, for example, phenyl, biphenyl, naphthyl, anthracenyl, pyrenyl, and the like. An aryl moiety generally contains from, for example, 6 to 30 carbon atoms, preferably from 6 to 18 carbon atoms, more preferably from 6 to 14 carbon atoms and most preferably from 6 to 10 carbon atoms. It is understood that the term aryl includes carbocyclic moieties that are planar and comprise $4n+2\pi$ electrons, according to Hückel's Rule, wherein n=1, 2, or 3.

In accordance with the invention, the term "heteroaryl" refers to a cyclic aromatic radical having from five to ten ring atoms of which at least one atom is O, S, or N, and the remaining atoms are carbon. Examples of heteroaryl radicals include pyridyl, pyrazinyl, pyrimidinyl, pyrrolyl, pyrazolyl, imidazolyl, thiazolyl, oxazolyl, isooxazolyl, thiadiazolyl, oxadiazolyl, thiophenyl, furanyl, quinolinyl, and isoquinolinyl. The term "heteroaryl" as used herein, means a monocyclic heteroaryl or a bicyclic heteroaryl. The monocyclic heteroaryl is a five- or six-membered ring. The five-membered ring consists of two double bonds and one sulfur, nitrogen or oxygen atom. Alternatively, the five-membered ring has two double bonds and one, two, three or four nitrogen atoms and optionally one additional heteroatom selected from oxygen or sulfur, and the others carbon atoms. The six-membered ring consists of three double bonds, one, two, three or four nitrogen atoms, and the others carbon atoms. The bicyclic heteroaryl consists of a monocyclic heteroaryl fused to a phenyl, or a monocyclic heteroaryl fused to a monocyclic cycloalkyl, or a monocyclic heteroaryl fused to a monocyclic cycloalkenyl, or a monocyclic heteroaryl fused to a monocyclic heteroaryl. The monocyclic and the bicyclic heteroaryl are connected to the parent molecular moiety through any substitutable atom contained within the monocyclic or the bicyclic heteroaryl. The monocyclic and bicyclic heteroaryl groups of the present invention can be substituted or unsubstituted. In addition, the nitrogen heteroatom may or may not be quaternized, and may or may not be oxidized to the N-oxide. Also, the nitrogen containing rings may or may not be N-protected. Representative examples of monocyclic heteroaryl include, but are not limited to, furanyl, imidazolyl, isoxazolyl, isothiazolyl, oxadiazolyl, oxazolyl, pyridinyl, pyridine-N-oxide, pyridazinyl, pyrimnidinyl, pyrazinyl, pyrazolyl, pyrrolyl, tetrazolyl, thiadiazolyl, thiazolyl, thienyl, triazolyl, and triazinyl. Representative examples of bicyclic heteroaryl groups include, but not limited to, benzothienyl, benzoxazolyl, benzimidazolyl, benzoxadiazolyl, 6,7-dihydro-1,3-benzothiazolyl, imidazo[1,2-a]pyridinyl, indazolyl, 1H-indazol-3-yl, indolyl, isoindolyl, isoquinolinyl, naphthyridinyl, pyridoimidazolyl, quinolinyl, quinolin-8-yl, and 5,6,7,8-tetrahydroquinolin-5-yl.

The "alkyl" group could be linear or branched. In accordance with an embodiment, the alkyl group is preferably a $C_1$-$C_{22}$ alkyl. Examples of alkyl group include methyl, ethyl, n-propyl, isopropyl, n-butyl, sec-butyl, isobutyl, tert-butyl, n-pentyl, isopentyl, n-hexyl, hexadecyl, and the like. This definition also applies wherever "alkyl" occurs such as in hydroxyalkyl, monohalo alkyl, dihalo alkyl, and trihalo alkyl. The $C_1$-$C_{22}$ alkyl group can also be further substituted with a cycloalkyl group, e.g., a $C_3$-$C_{11}$ cycloalkyl group.

The "cycloalkyl" group can be monocyclic or bicyclic. Examples of monocyclic cycloalkyl groups include cyclopropyl, cyclobutyl, cyclopentyl, cyclohexyl, cycloheptyl, and cyclooctyl. Examples of bicyclic cycloalkyl groups include those with one common ring carbon atom such as spirooctane, spirononane, spirodecane, and spiroundecane, and those with two common ring carbon atoms such as bicyclooctane, bicyclononane, bicyclodecane, and bicycloundecane. Any of the cycloalkyl groups could be optionally substituted with one or more alkyl groups, e.g., $C_1$-$C_6$ alkyl groups.

In accordance with an embodiment, the "alkoxy" group is preferably a $C_1$-$C_{22}$ alkoxy. Examples of alkoxy group include methoxy, ethoxy, n-propoxy, isopropoxy, n-butoxy, sec-butoxy, isobutoxy, tert-butoxy, n-pentoxy, isopentoxy, n-hexoxy, hexadecyloxy, and the like.

The term "halo" refers to a halogen selected from the group consisting of fluorine, chlorine, bromine, and iodine, preferably chlorine or bromine.

The term "heterocycle" or "heterocyclic" as used herein, means a monocyclic heterocycle or a bicyclic heterocycle. The monocyclic heterocycle is a three-, four-, five-, six- or seven-membered ring containing at least one heteroatom independently selected from the group consisting of O, N, N(H) and S. The three- or four-membered ring contains zero or one double bond and a heteroatom selected from the group consisting of O, N, N(H) and S. The five-membered ring contains zero or one double bond, and one, two or three heteroatoms selected from the group consisting of O, N, N(H) and S. The six-membered ring contains zero, one or two double bonds and one, two or three heteroatoms selected from the group consisting of O, N, N(H) and S. The seven-membered ring contains zero, one, two, or three double bonds and one, two or three heteroatoms selected from the group consisting of O, N, N(H) and S. The monocyclic heterocycle can be unsubstituted or substituted and is connected to the parent molecular moiety through any substitutable carbon atom or any substitutable nitrogen atom contained within the monocyclic heterocycle. Representative examples of monocyclic heterocycle include, but are not limited to, azetidinyl, azepanyl, aziridinyl, diazepanyl, [1,4]diazepan-1-yl, 1,3-dioxanyl, 1,3-dioxolanyl, 1,3-dithiolanyl, 1,3-dithianyl, homomorpholinyl, homopiperazinyl, imidazolinyl, imidazolidinyl, isothiazolinyl, isothiazolidinyl, isoxazolinyl, isoxazolidinyl, morpholinyl, oxadiazolinyl, oxadiazolidinyl, oxazolinyl, oxazolidinyl, piperazinyl, piperidinyl, pyranyl, pyrazolinyl, pyrazolidinyl, pyrrolinyl, pyrrolidinyl, tetrahydrofuranyl, tetrahydropyranyl, tetrahydrothienyl, thiadiazolinyl, thiadiazolidinyl, thiazolinyl, thiazolidinyl, thiomorpholinyl, 1,1-dioxidothiomorpholinyl (thiomorpholine sulfone), thiopyranyl, and trithianyl. The bicyclic heterocycle is a monocyclic heterocycle fused to a phenyl group, or a monocyclic heterocycle fused to a monocyclic cycloalkyl, or a monocyclic heterocycle fused to a monocyclic cycloalkenyl, a monocyclic heterocycle fused to a monocyclic heterocycle, or a monocyclic heterocycle fused to a monocyclic heteroaryl. The bicyclic heterocycle is connected to the parent molecular moiety through any substitutable carbon atom or any substitutable nitrogen atom contained within the bicyclic heterocycle and can be unsubstituted or substituted. Representative examples of bicyclic heterocycle include, but are not limited to, benzodioxinyl, benzopyranyl, thiochromanyl, 2,3-dihydroindolyl, indolizinyl, pyranopyridinyl, 1,2,3,4-tetrahydroisoquinolinyl, 1,2,3,4-tetrahydroquinolinyl, thiopyranopyridinyl, 2-oxo-1,3-benzoxazolyl, 3-oxo-benzoxazinyl, 3-azabicyclo[3.2.0]heptyl, 3,6-diazabicyclo[3.2.0]heptyl, octahydrocyclopenta[c]pyrrolyl, hexahydro-1H-furo[3,4-c]pyrrolyl, octahydropyrrolo[3,4-c]pyrrolyl, 2,3-dihydrobenzofuran-7-yl, 2,3-dihydrobenzofuran-3-yl, and 3,4-dihydro-2H-chromen-4-yl. The monocyclic or bicyclic heterocycles as defined herein may have two of the non-adjacent carbon atoms connected by a heteroatom selected from N, N(H), O or S, or an alkylene bridge of between one and three additional carbon atoms. Representative examples of monocyclic or bicyclic heterocycles that contain such connection between two non-adjacent carbon atoms include, but not limited to, 2-azabicyclo[2.2.2]octyl, 2-oxa-5-azabicyclo[2.2.2]octyl, 2,5-diazabicyclo[2.2.2]octyl, 2-azabicyclo[2.2.1]heptyl, 2-oxa-5-azabicyclo[2.2.1]heptyl, 2,5-diazabicyclo[2.2.1]heptyl, 2-azabicyclo[2.1.1]hexyl, 5-azabicyclo[2.1.1]hexyl, 3-azabicyclo[3.1.1]heptyl, 6-oxa-3-azabicyclo[3.1.1]heptyl, 8-azabicyclo[3.2.1]octyl, 3-oxa-8-azabicyclo[3.2.1]octyl, 1,4-diazabicyclo[3.2.2]nonyl, 1,4-diazatricyclo[4.3.1.1 3,8]undecyl, 3,10-diazabicyclo[4.3.1]decyl, or 8-oxa-3-azabicyclo[3.2.1]octyl, octahydro-1H-4,7-methanoisoindolyl, and octahydro-1H-4,7-epoxyisoindolyl. The nitrogen heteroatom may or may not be quaternized, and may or may not be oxidized to the N-oxide. In addition, the nitrogen containing heterocyclic rings may or may not be N-protected.

Examples of heterocyclyl groups include pyridyl, piperidinyl, piperazinyl, pyrazinyl, pyrolyl, pyranyl, tetrahydropyranyl, tetrahydrothiopyranyl, pyrrolidinyl, furanyl, tetrahydrofuranyl, thiophenyl, tetrahydrothiophenyl, purinyl, pyrimidinyl, thiazolyl, thiazolidinyl, thiazolinyl, oxazolyl, triazolyl, tetrazolyl, tetrazinyl, benzoxazolyl, morpholinyl, thiophorpholinyl, quinolinyl, and isoquinolinyl.

Five-membered unsaturated heterocyclics with and without benzo: furanyl, thiopheneyl, pyrrolyl, pyrazolyl, pyrazolinyl, imidazolyl, imidazolinyl, dithiazolyl, furazanyl, 1,2,3-triazolyl, tetrazolyl, 1,2,4-triazolyl, oxadiazolyl, thiadiazolyl, isoxazolyl, isoxazolinyl, oxazolyl, oxazolinyl, phospholyl, isothiazolyl, thiazolyl, thiazolinyl, isothiazolyl, isothiazolidinyl, benzofuranyl, benzothiopheneyl, indolyl, benzimidazolyl, benzoxazolinyl, and benzothiazolinyl.

Whenever a range of the number of atoms in a structure is indicated (e.g., a $C_{1-22}$, a $C_{1-12}$, $C_{1-8}$, $C_{1-6}$, or $C_{1-4}$ alkyl, alkoxy, etc.), it is specifically contemplated that any subrange or individual number of carbon atoms falling within the indicated range also can be used. Thus, for instance, the recitation of a range of 1-22 carbon atoms (e.g., $C_1$-$C_{22}$), 1-20 carbon atoms (e.g., $C_1$-$C_{70}$), 1-18 carbon atoms (e.g., $C_1$-$C_{20}$), 1-16 carbon atoms (e.g., $C_1$-$C_{16}$), 1-14 carbon atoms (e.g., $C_1$-$C_{14}$), 1-12 carbon atoms (e.g., $C_1$-$C_{12}$), 1-10 carbon atoms (e.g., $C_1$-$C_{10}$), 1-8 carbon atoms (e.g., $C_1$-$C_8$), 1-6 carbon atoms (e.g., $C_1$-$C_6$), 1-4 carbon atoms (e.g., $C_1$-$C_4$), 1-3 carbon atoms (e.g., $C_1$-$C_3$), or 2-8 carbon atoms (e.g., $C_2$-$C_8$) as used with respect to any chemical group (e.g., alkyl, alkoxy, alkylamino, etc.) referenced herein encompasses and specifically describes 1, 2, 3, 4, 5, 6, 7, 8, 9, 10, 11, 12, 13, 14, 15, 16, 17, 18, 19, 20, 21, or 22 carbon atoms, as appropriate, as well as any sub-range thereof, e.g., 1-2 carbon atoms, 1-3 carbon atoms, 1-4 carbon atoms, 1-5 carbon atoms, 1-6 carbon atoms, 1-7 carbon atoms, 1-8 carbon atoms, 1-9 carbon atoms, 1-10 carbon atoms, 1-11 carbon atoms, 1-12 carbon atoms, 1-13 carbon atoms, 1-14 carbon atoms, 1-15 carbon atoms, 1-16 carbon atoms, 1-17 carbon atoms, 1-18 carbon atoms, 1-19 carbon atoms, 1-20 carbon atoms, 1-21 carbon atoms, and 1-22 carbon atoms, and anything in between such as 2-3 carbon atoms, 2-4 carbon atoms, 2-5 carbon atoms, 2-6 carbon atoms, 2-7 carbon atoms, 2-8 carbon atoms, 2-9 carbon atoms, 2-10 carbon atoms, 2-11 carbon atoms, 2-12 carbon atoms, 2-12 carbon atoms, 2-13 carbon atoms, 2-14 carbon atoms, 2-15 carbon atoms, 2-16 carbon atoms, 2-17 carbon atoms, 2-18 carbon atoms, 2-19 carbon atoms, 2-20 carbon atoms, 2-21 carbon atoms, and 2-22 carbon atoms, 3-4 carbon atoms, 3-5 carbon atoms, 3-6 carbon atoms, 3-7 carbon atoms, 3-8 carbon atoms, 3-9 carbon atoms, 3-10 carbon atoms, 3-11 carbon atoms, 3-12 carbon atoms, 3-13 carbon atoms, 3-14 carbon atoms, 3-15 carbon atoms, 3-16 carbon atoms, 3-17 carbon atoms, 3-18 carbon atoms, 3-19 carbon atoms, 3-20 carbon atoms, 3-21 carbon atoms, and 3-22 carbon atoms, and 4-5 carbon atoms, 4-6 carbon atoms, 4-7 carbon atoms, 4-8 carbon atoms, 4-9 carbon atoms, 4-10 carbon atoms, 4-11 carbon atoms, 4-12 carbon atoms, 4-13 carbon atoms, 4-14 carbon atoms, 4-15 carbon atoms, 4-16 carbon atoms, 4-17 carbon atoms, 4-18 carbon atoms, 4-19 carbon atoms, 4-20 carbon atoms, 4-21 carbon atoms, 4-22 carbon atoms, etc., as appropriate.

In the above embodiments, "n" and "m" represent the average degree of polymerization of the respective monomers.

In accordance with embodiments of the invention, n is about 10 to about 1000, about 10 to about 500, about 10 to about 250, about 20 to about 1000, about 20 to about 500, about 20 to about 250, about 30 to about 1000, about 30 to about 500, about 30 to about 250, about 40 to about 1000, about 40 to about 500, about 40 to about 250, about 50 to about 1000, about 50 to about 500, about 50 to about 250, about 60 to about 1000, about 60 to about 500, or about 60 to about 250.

In any of the above embodiments, m is about 50 to about 2000, about 50 to about 1500, about 50 to about 1000, about 100 to about 2000, about 100 to about 1500, about 100 to about 1000, about 150 to about 2000, about 150 to about 1500, about 150 to about 1000, about 200 to about 2000, about 200 to about 1500, or about 200 to about 1000.

In any of the above embodiments, n is typically about 10 to about 200, preferably about 20 to about 190, more preferably about 30 to about 140, and even more preferably 105.

In any of the above embodiments of the diblock copolymer, m is typically about 50 to about 2000, preferably about 675 to about 1525, more preferably about 675 to about 1120, and even more preferably 870.

In an embodiment, n is about 10 to about 200 and m is about 80 to about 160.

The diblock copolymer can have any suitable total molecular weight, for example, a number average molecular weight ($M_n$) of from about 50 kDa to about 1000 kDa; in certain embodiments, the diblock copolymer has an $M_n$ of from about 100 kDa to about 600 kDa; in certain other embodiments, the diblock copolymer has an $M_n$ of from about 180 kDa to about 500 kDa; and in further embodiments, the diblock copolymer has an $M_n$ of from about 195 kDa to about 441 kDa. In certain embodiments, the diblock copolymer has an $M_n$ of from about 250 kDa to about 500 kDa.

The double bonds in the diblock copolymer can have any suitable orientation, cis, trans, and they can be distributed in a random manner.

The diblock copolymer may self-assemble into any suitable morphology, for example, but not limited to, spherical or body centered cubic morphology, cylindrical morphology, lamellar morphology, or double gyroid morphology. The type of nanostructure into which the copolymers self-assemble would depend, among others, on the volume fraction of the two blocks in the block copolymer as well as the nature of the solvent system.

For example, at a polymer volume fraction ratio range ($f_A:f_B$) of the two monomers of 37-50:63-50, formation of a lamellar morphology involving a stack of layers of equivalent domain size is favored, at a volume fraction ratio range of 15-70:85-30, formation of a cylindrical morphology where the minor polymer component forms cylinders in a matrix of major polymer block component is favored, and at a volume fraction ratio range of 7-15:83-85, formation of spherical morphology or body centered cubic (bcc) morphology where the minor polymer component forms spheres in a matrix of the major polymer block component is favored. At a volume fraction ratio range of 33-37:67-33, formation of a double gyroid morphology is favored.

Cylindrical morphology includes a phase domain morphology having discrete tubular or cylindrical shapes. The tubular or cylindrical shapes may be hexagonally packed on a hexagonal lattice. In embodiments, the cylindrical domain size is from about 5 nm to about 100 nm.

Lamellar morphology includes a phase domain morphology having layers of alternating compositions that are generally oriented parallel with respect to one another. In embodiments, the lamellar domain size is from about 5 nm to about 100 nm.

The double gyroid morphology comprises two interpenetrating continuous network. In embodiments, the double gyroid domain size is from about 5 nm to about 100 nm.

Spherical morphology or bcc morphology refers to a phase domain morphology having spherical domains of one block arranged on a body centered cubic lattice in a matrix of the second block. In embodiments, the spherical morphology domain size is from about 5 nm to about 100 nm.

In an embodiment, the polymerized second monomer (bearing $R^2$) and the polymerized first monomer (bearing $R^1$) are present in the diblock copolymer in any suitable volume fraction. For example, the % volume fraction of the first monomer to that of the second monomer can be in the range of about 15: about 85 to about 30: about 70, preferably in the range of about 19: about 81 to about 25: about 75, and more preferably about 20: about 80. In an embodiment, the volume fraction of the second monomer is about 80%, and the mass fraction is 83%, of the total polymer.

In an embodiment, the volume fraction of the second monomer to that of the first monomer is about 2.3 to 5.6:1, which favors the formation of a cylindrical morphology. In a preferred embodiment, the volume fraction of the second monomer to that of the first monomer is about 4:1.

In a specific embodiment, the diblock copolymer of formula (I) has the following structure, in particular, wherein n is 105 and m is 870:

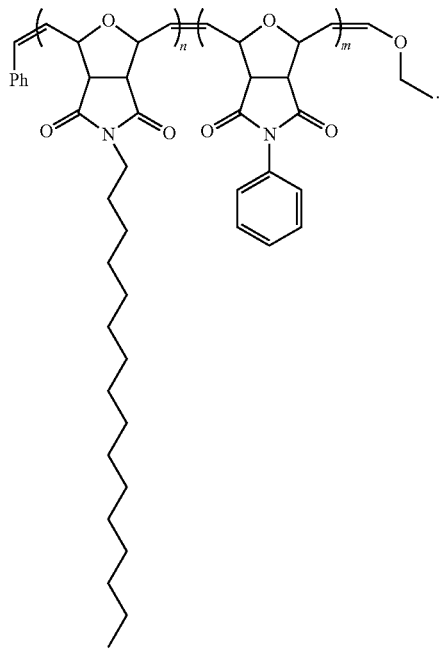

In an embodiment, the diblock copolymer of formula (I) has the following structure where the monomers are in the exo configuration, in particular, wherein n is 105 and m is 870:

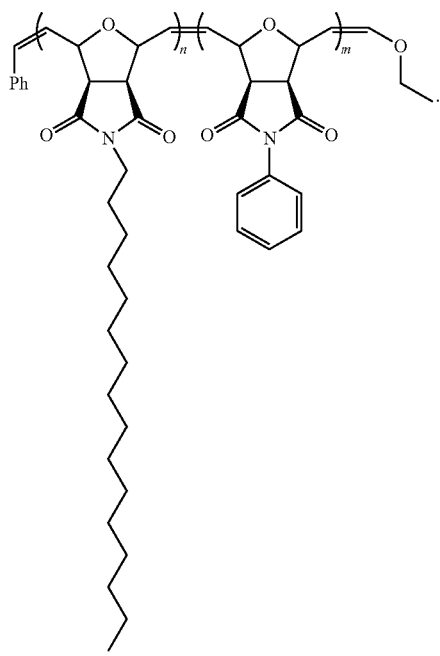

The present invention further provides a method of preparing diblock copolymers of formula (I) described above, comprising:

(i) polymerizing one of the two monomers of the formulas:

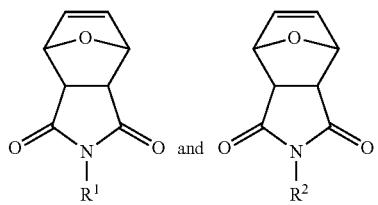

with a ring opening metathesis polymerization (ROMP) catalyst to obtain a ring-opened polymer having a living chain end;

(ii) polymerizing the other of the two monomers on the living end of the ring-opened polymer obtained in (i) to obtain a diblock copolymer having a living end; and (iii) terminating the living end of the diblock copolymer obtained in (ii) with an optionally substituted alkyl vinyl ether.

In an embodiment of the above method, the monomer that is first polymerized is of the formula:

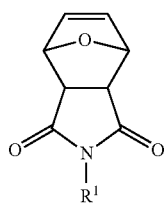

After the polymerization of the above monomer, the second monomer that is polymerized thereon is a monomer of the formula:

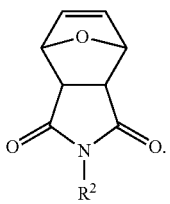

The first monomer and the second monomer can be an exo or endo stereochemical configuration. In an embodiment, the first and second monomers are of the exo configuration, e.g., a monomer having the exo isomer at 98% or higher.

In the first and second monomers, $R^1$ and $R^2$ are the same as described above for the diblock copolymer of formula (I). The first and second monomers are (oxa)norbornene (di) carboxylic imide derived monomers. The monomers can be prepared by any suitable method, for example, starting from maleimide and furan via a Diels-Alder reaction, illustrated below:

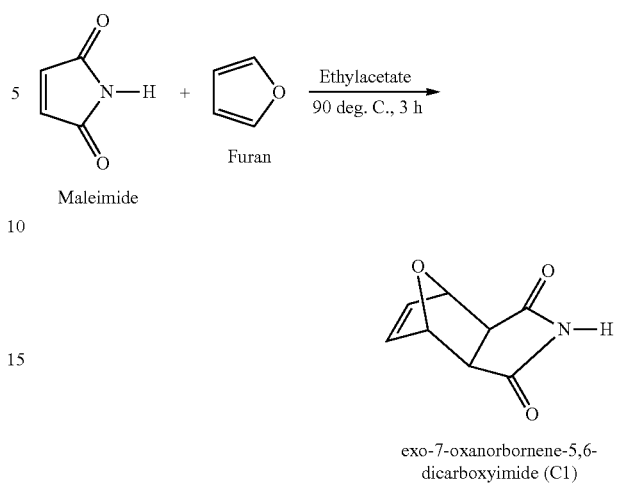

The first monomer can be synthesized via Mitsunobu Coupling reaction, as illustrated below:

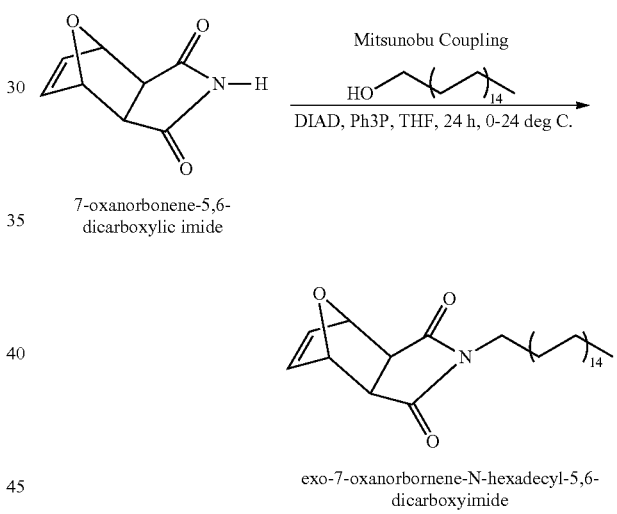

Alternatively, the first monomer can be synthesized by the reaction of exo-7-oxanorbornene-5,6-dicarboxyanhydride with hexadecylamine or N-hexadecyl-maleimide reaction with furan via a Diels-Alder reaction.

The second monomer can be synthesized via a Diels-Alder reaction between N-phenyl maleimide and furan in acetonitrile, as illustrated below.

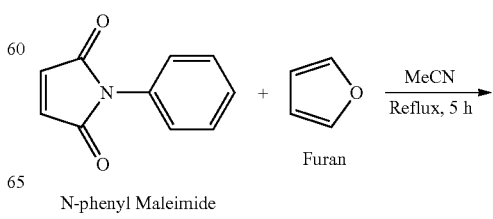

-continued

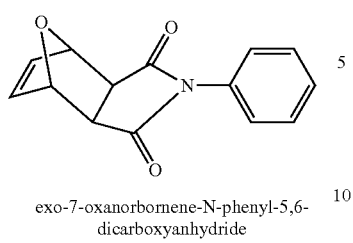

exo-7-oxanorbornene-N-phenyl-5,6-dicarboxyanhydride

The polymerization of the monomers is carried out by ring-opening olefin metathesis polymerization (ROMP), in which a cyclic olefin monomer is polymerized or copolymerized by ring-opening of the cyclic olefin monomer. Typically a transition metal catalyst containing a carbene ligand mediates the metathesis reaction.

Any suitable ROMP catalyst can be used, for example, Grubbs' first, second, and third generation catalysts, Umicore, Hoveyda-Grubbs, Schrock, and Schrock-Hoveyda catalysts can be employed. Examples of such catalysts include the following:

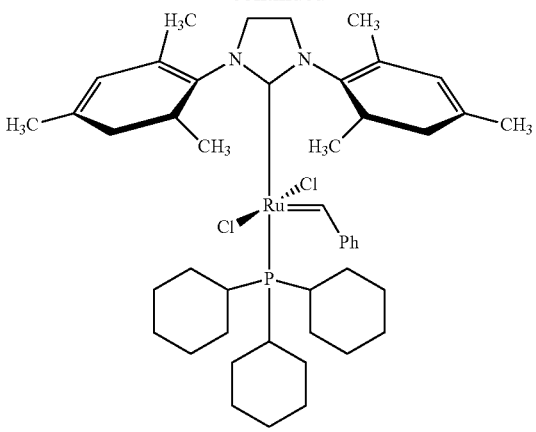

,

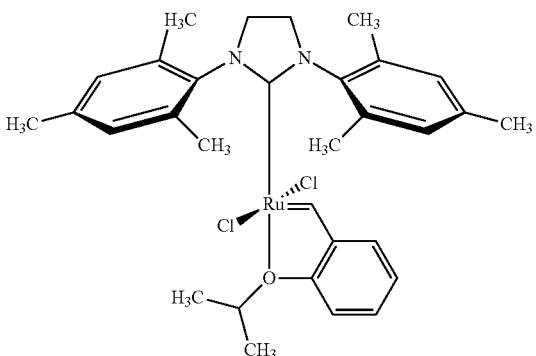

,

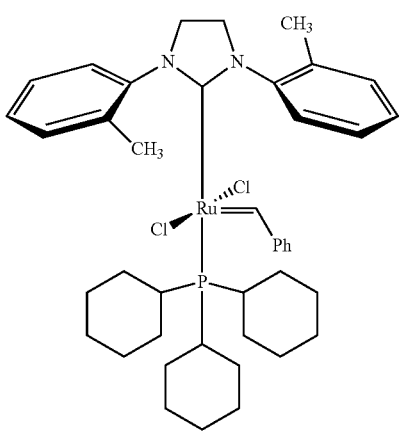

,

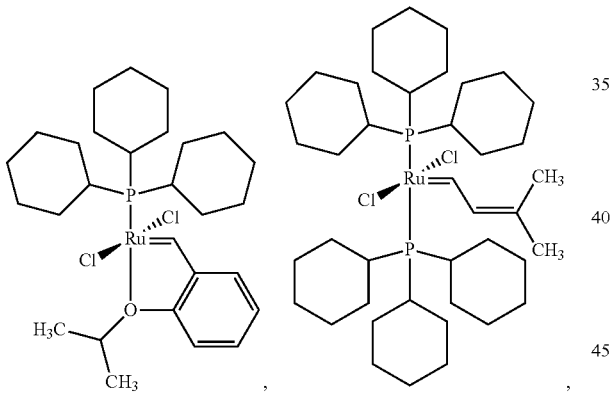

,

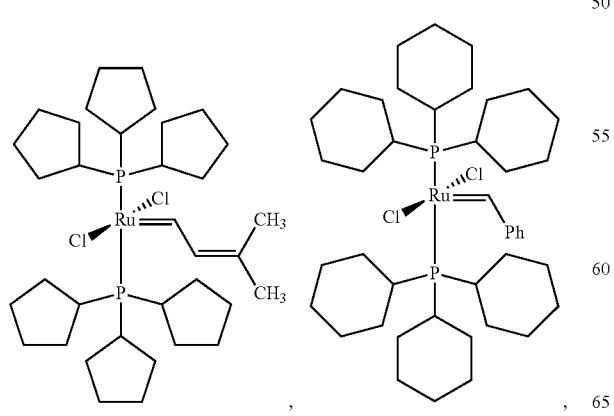

,

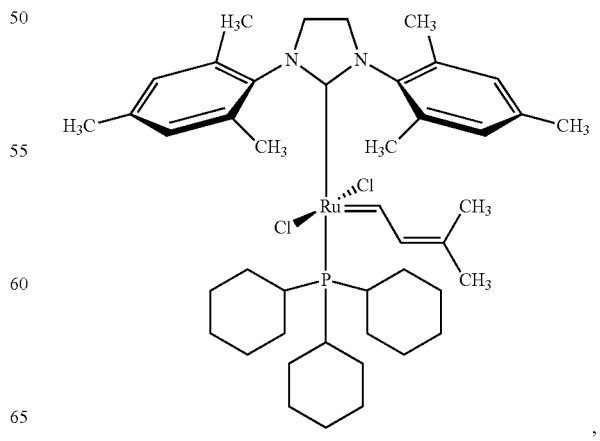

,

13
-continued
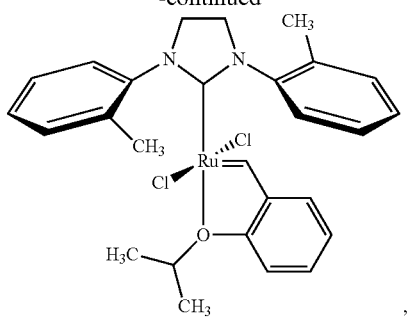
,
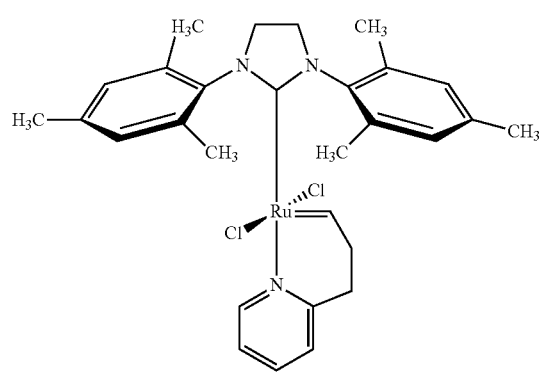
,
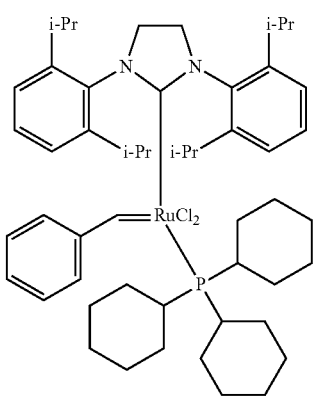
,
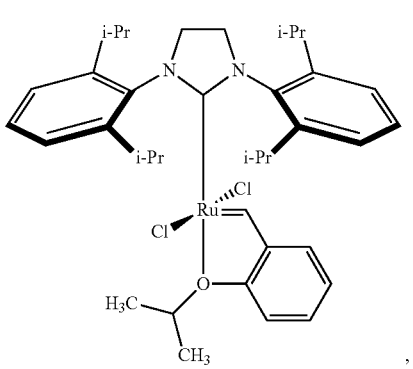
,
14
-continued
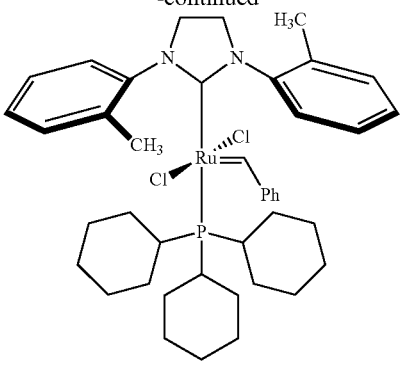
,
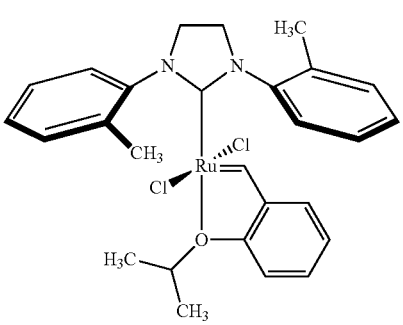
,
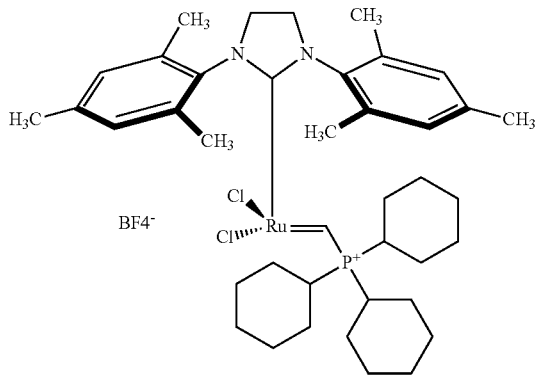
,
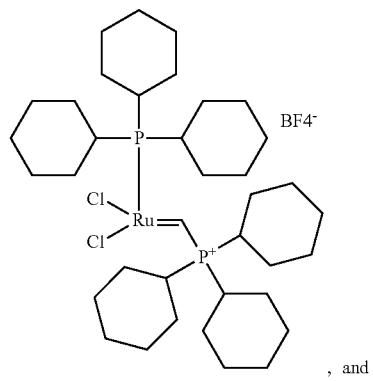
, and -continued

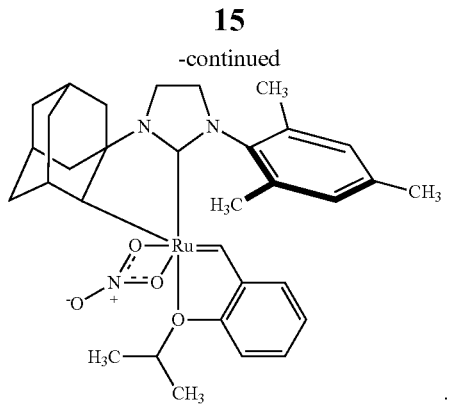

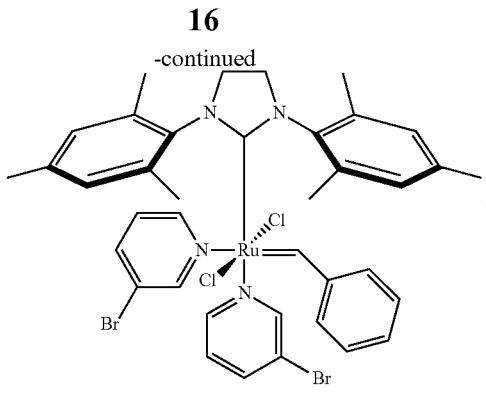

G3

In an embodiment, Grubbs' third generation catalysts are particularly suitable due to their advantages such as stability in air, tolerance to multiple functional groups, and/or fast polymerization initiation and propagation rates. In addition, with the Grubbs' third generation catalysts, the end groups can be engineered to accommodate any compatible groups, and the catalyst can be recycled readily. A preferred example of such a catalyst is:

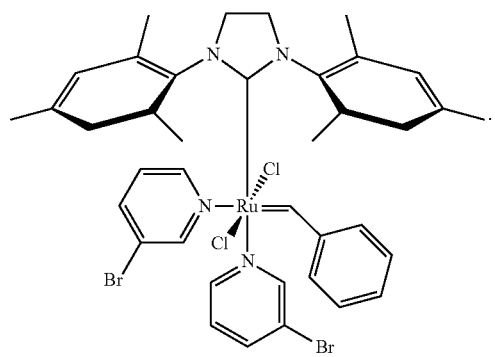

The above third generation Grubbs catalyst (G3) may be obtained commercially or prepared from a Grubbs second generation catalyst (G2) as follows:

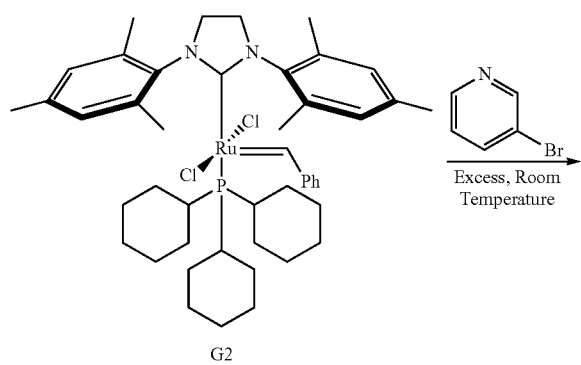

G2

The first monomer and the second monomer are polymerized sequentially to obtain the diblock copolymer. In accordance with the invention, any one of the two monomers can be polymerized. For example, the first monomer can be polymerized first, followed by the second monomer. Alternatively, the second monomer can be polymerized first, followed by the first monomer.

Typically, the monomers have a chemical purity of at least 95%, preferably 99% or greater, and more preferably 99.9% or greater. It is preferred that the monomers are free of impurities that will interfere with the polymerization, e.g., impurities that will affect the ROMP catalyst. Examples of such impurities include amines, thiols, acids, phosphines, and N-substituted maleimides.

The polymerization of the monomers is conducted in a suitable solvent, for example, solvents generally used for conducting ROMP polymerizations. Examples of suitable solvents include aromatic hydrocarbons such as benzene, toluene, and xylene, aliphatic hydrocarbons such as n-pentane, hexane, and heptane, alicyclic hydrocarbons such as cyclohexane, and halogenated hydrocarbons such as dichloromethane, dichloroethane, dichloroethylene, tetrachloroethane, chlorobenzene, dichlorobenzene, and trichlorobenzene, as well as mixtures thereof.

The monomer concentration can be in the range of 1 to 50 wt %, preferably 2 to 45 wt %, and more preferably 3 to 40 wt %.

The polymerization can be carried out at any suitable temperature, for example, from −20 to +100° C., preferably 10 to 80° C.

The polymerization can be carried out for any time suitable to obtain the appropriate chain length of each of the blocks, which can be from about 1 minute to 100 hours.

The amount of catalyst can be chosen in any suitable amount. For example, the molar ratio of the catalyst to the monomer can be about 1:10 to about 1:1000, preferably about 1:50 to 1:500, and more preferably about 1:100 to about 1:200. For example, the molar ratio of the catalyst to the monomer could be 1:n and 1:m, where n and m are the average degrees of polymerization.

After the polymerization of the two monomers, the chain end of the diblock copolymer is terminated by adding an optionally substituted alkyl vinyl ether to the polymerization mixture.

The diblock copolymer can be isolated by a suitable technique, for example, precipitation with a nonsolvent.

The homopolymer formed during the preparation of the diblock copolymer and the diblock copolymer of the invention can be characterized for its molecular weight and molecular weight distribution by any known techniques. For example, a MALS-GPC technique can be employed. The technique uses a mobile phase to elute, via a high pressure pump, a polymer solution through a bank of columns packed with a stationary phase. The stationary phase separates the polymer sample according to the chain size followed by detecting the polymer by three different detectors. A series of detectors can be employed, e.g., an Ultraviolet detector (UV-detector), followed by a multi-angle laser light scattering detector (MALS-detector), which in turn, is followed by a refractive index detector (RI-detector) in a row. The UV-detector measures the polymer light absorption at 254 nm wavelength; the MALS-detector measures the scattered light from polymer chains relative to mobile phase.

The diblock copolymers of the invention are highly monodisperse. For example, the copolymers have an Mw/Mn of 1.01 to 1.2, preferably 1.05 to 1.10.

The present invention further provides a porous membrane comprising a diblock copolymer described above. The diblock copolymer can be dissolved in a suitable solvent system. For example, the solvent system includes a solvent or a mixture of solvents selected from dichloromethane, 1-chloropentane, chloroform, 1,1-dichloroethane, N,N-dimethylformamide (DMF), N,N-dimethylacetamide (DMA), N-methylpyrrolidone (NMP), dimethylsulfoxide (DMSO), tetrahydrofuran (THF), 1,3-dioxane, and 1,4-dioxane.

The polymer solution is cast as a thin film on a suitable substrate by any suitable method, for example, spin coating, hybrid casting, or spray coating. For example, in hybrid casting, the solvent is allowed to evaporate from the thin film so that the diblock copolymer undergoes self-assembly into membranes having nanostructures. The coating which contains nanostructures is allowed to undergo phase inversion by immersing it in a nonsolvent such as isopropanol, pentane, or hexane, or a mixture containing isopropanol, DMSO, and/or water.

Figure 2:
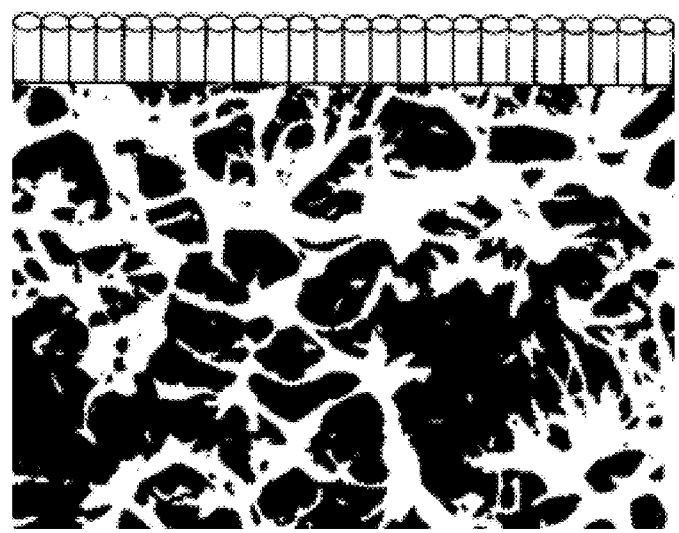
FIG. 2 illustrates a nanostructure of a porous membrane comprising a diblock copolymer in accordance with an embodiment of the invention.

The cross-section of a membrane according to an embodiment of the invention is depicted as an illustrative diagram in FIG. 2 and is characterized by a thin nanoporous layer at the top where the polymer assumes a cylindrical morphology, which is supported by a porous polymer layer of random morphology.

In accordance with an embodiment of the invention, the porous membrane is a nanoporous membrane, for example, a membrane having pores of diameter between 1 nm and 100 nm.

Porous membranes according to embodiments of the invention can be used in a variety of applications, including, for example, diagnostic applications (including, for example, sample preparation and/or diagnostic lateral flow devices), ink jet applications, filtering fluids for the pharmaceutical industry, filtering fluids for medical applications (including for home and/or for patient use, e.g., intravenous applications, also including, for example, filtering biological fluids such as blood (e.g., to remove leukocytes)), filtering fluids for the electronics industry (e.g., filtering photoresist fluids in the microelectronics industry), filtering fluids for the food and beverage industry, clarification, filtering antibody- and/or protein-containing fluids, filtering nucleic acid-containing fluids, cell detection (including in situ), cell harvesting, and/or filtering cell culture fluids. Alternatively, or additionally, membranes according to embodiments of the invention can be used to filter air and/or gas and/or can be used for venting applications (e.g., allowing air and/or gas, but not liquid, to pass therethrough). Membranes according to embodiments of the inventions can be used in a variety of devices, including surgical devices and products, such as, for example, ophthalmic surgical products.

In accordance with embodiments of the invention, the porous membrane can have a variety of configurations, including planar, flat sheet, pleated, tubular, spiral, and hollow fiber.

Porous membranes according to embodiments of the invention are typically disposed in a housing comprising at least one inlet and at least one outlet and defining at least one fluid flow path between the inlet and the outlet, wherein at least one inventive membrane or a filter including at least one inventive membrane is across the fluid flow path, to provide a filter device or filter module. In an embodiment, a filter device is provided comprising a housing comprising an inlet and a first outlet, and defining a first fluid flow path between the inlet and the first outlet; and at least one inventive membrane or a filter comprising at least one inventive membrane, the inventive membrane or filter comprising at least one inventive membrane being disposed in the housing across the first fluid flow path.

Preferably, for crossflow applications, at least one inventive membrane or filter comprising at least one inventive membrane is disposed in a housing comprising at least one inlet and at least two outlets and defining at least a first fluid flow path between the inlet and the first outlet, and a second fluid flow path between the inlet and the second outlet, wherein the inventive membrane or filter comprising at least one inventive membrane is across the first fluid flow path, to provide a filter device or filter module. In an illustrative embodiment, the filter device comprises a crossflow filter module, the housing comprising an inlet, a first outlet comprising a concentrate outlet, and a second outlet comprising a permeate outlet, and defining a first fluid flow path between the inlet and the first outlet, and a second fluid flow path between the inlet and the second outlet, wherein at least one inventive membrane or filter comprising at least one inventive membrane is disposed across the first fluid flow path.

The filter device or module may be sterilizable. Any housing of suitable shape and providing an inlet and one or more outlets may be employed.

The housing can be fabricated from any suitable rigid impervious material, including any impervious thermoplastic material, which is compatible with the fluid being processed. For example, the housing can be fabricated from a metal, such as stainless steel, or from a polymer, e.g., transparent or translucent polymer, such as an acrylic, polypropylene, polystyrene, or a polycarbonate resin.

The following examples further illustrate the invention but, of course, should not be construed as in any way limiting its scope.

EXAMPLE 1

This example provides the materials used in the preparation of the monomers and polymers.

Maleimide, furan, diisopropylazodicarboxylate (DIAD), triphenylphosphine (Ph$_3$P), 1-haxadecanol, tetrahydrofuran (THF), ethyl acetate, N-phenylmaleimide, acetonitrile, methanol, Grubbs second generation catalyst, 3-bromopyridine, and pentane were obtained from Sigma-Aldrich Co. and used without further treatment. Dichloropentane, also obtained from Sigma-Aldrich Co., was treated with basic alumina before use.

EXAMPLE 2

This example illustrates the preparation of exo-7-oxanorbornene-5,6-dicarboxyimide (C1), an intermediate in the preparation of the first and second monomers in accordance with an embodiment of the invention.

In a clean 500 mL round bottom flask (RBF) equipped with magnetic stirring bar, furan (21.0 g, 309 mmol) was added to a solution of maleimide (25 g, 258 mmol) in 250 mL of ethyl acetate. The mixture was heated at 90° C. for 30 h. C1 was obtained as white precipitate from solution upon washing with ether (100 mL, 3×) and filtration. The white solid was dried under vacuum at room temperature for 24 h. C1 was obtained as a pure exo-isomer in yield of 29 g, 68%. $^1$H-NMR (300 MHz, CDCl$_3$): δ (ppm) 8.09 (s, 1H), 6.53 (s, 2H), 5.32 (s, 2H), 2.89 (s, 2H).

EXAMPLE 3

This example illustrates the preparation of dichloro[1,3-bis(2,4,6-trimethylphenyl)-2-imidazolidinylidene](benzylidene)bis(3-bromopyridine)ruthenium(II) (G3) catalyst.

The second generation Grubbs catalyst (G2) illustrated above (1.0 g, 1.18 mmol) was mixed with 3-bromopyridine (1.14 mL, 11.8 mmol) in 50 mL flask. Upon stirring at room temperature for 5 min, the red mixture turned into bright green. Pentane (40 mL) was added with stirring for 15 minutes and green solid was obtained. The mixture was cooled in the freezer for 24 h and filtered under vacuum. The resulting G3 catalyst, a green solid, was washed with cold pentane and dried under vacuum at room temperature to give a yield of 0.9 g, 88% yield.

EXAMPLE 4

This example illustrates the preparation of a first monomer in accordance with an embodiment of the invention, exo-7-oxanorbornene-N-hexadecyl-5,6-dicarboxyimide.

In a clean 500 mL RBF equipped with magnetic stirring bar, a mixture of exo-7-oxanorbornene-5,6-dicarboxyimide (C1) (10 g, 61 mmol), Ph$_3$P (23.84 g, 91 mmol), and 1-hexadecanol (17.6 g, 72.7 mmol) were dissolved in anhydrous THF (130 mL) under a stream of dry nitrogen gas. The solution was cooled in ice bath. DIAD (22.1 g, 109.3 mmol) was added from a dropping funnel, drop-wise, to the cooled solution. The reaction mixture was allowed to warm up to room temperature and stirred for 24 h. THF was removed by rotary evaporator till dryness to obtain white solid. The first monomer was obtained from the crude as white solid upon crystallization from methanol (2×) and drying at room temperature under vacuum for 24 h (yield of 18.6 g, 80%). $^1$H-NMR (300 MHz, CDCl$_3$): δ (ppm) 6.5 (s, 2H), 5.26 (s, 2H), 5.32 (s, 2H), 3.45 (t, 2H), 2.82 (s, 2H), 1.56-1.38 (m, 2H), 1.28-1.1 (m, 26H), 0.88 (t, 3H).

EXAMPLE 5

This example illustrates the preparation of a second monomer in accordance with an embodiment of the invention, exo-7-oxanorbornene-N-phenyl-5,6-dicarboxyimide.

In a clean 500 mL round bottom flask (RBF) equipped with magnetic stirring bar, Furan (29.51 g, 433.5 mmol) was added to a solution of N-phenyl maleimide (25 g, 144.5 mmol) in 135 mL of acetonitrile. The solution was refluxed at 90° C. for 5 h. A white crystalline solid was obtained upon cooling the reaction mixture. The second monomer was obtained by filtering the solid and purified by recrystallization from acetonitrile (2×). Yield of 19 g, 76%. $^1$H-NMR (300 MHz, CDCl$_3$): δ (ppm) 7.55-7.35 (m, 3H, phenyl), 7.35-7.2 (m, 2H, phenyl), 6.57 (s, 2H), 5.37 (s, 2H), 3.05 (s, 2H).

EXAMPLE 6

This example illustrates the preparation of a diblock copolymer in accordance with an embodiment of the invention.

The Grubbs 3$^{rd}$ generation (G3) catalyst from Example 3 (34.4 mg, 0.039 mmol) was weighed in 40 mL vial with equipped with fluoropolymer resin-silicone septa open-top cap. The catalyst was dissolved in argon-degassed dichloromethane (DCM) (60 mL) and transferred via cannula to a clean 1 L RBF equipped with stirring bar. A solution of the first monomer (1.5 g, 3.85 mmol) in DCM (86 mL) was degassed with argon and transferred into the catalyst solution and shined for 30 minutes. An aliquot of 1-2 mL of the homopolymer formed from the first monomer was taken after 30 minutes for molecular weight characterization. A solution of the second monomer (7.9 g, 32.8 mmol) in DCM (208 mL) was degassed with argon and transferred into the growing homopolymer solution in the RBF, and the contents of the flask were stirred for another 60 minutes. Ethyl vinyl ether (2 mL) was then added to the yellow solution of the diblock copolymer to terminate the polymerization. The resulting polymer was precipitated in methanol (2 L, 2×) to recover the pure polymer as a white solid. The polymer was filtered and dried under vacuum at room temperature; yield (9.2 g, 98%). $^1$H-NMR (300 MHz, CDCl$_3$): δ (ppm) 7.7-7.25 (m, 3H, phenyl), 7.25-6.8 (m, 2H, phenyl), 6.3-5.9 (broad, 1H), 5.9-5.3 (broad m, 1H), 5.3-4.9 (broad m, 1H), 4.9-4.2 (broad m, 1H), 3.6-3.0 (broad s, 2H), 1.6-1.4 (broad, 2H), 1.4-1.0 (s, 26H), 0.88 (t s, 3H).

EXAMPLE 7

This example illustrates a method to characterize the diblock copolymer of the present invention involving the Multi-angle Laser Light Scattering and gel permeation chromatography (GPC).

The homopolymer and diblock copolymer obtained in Example 6 were characterized for their molecular weight and molecular weight distribution properties by the MALS-GPC technique under the following conditions:

Mobile phase: Dichloromethane (DCM).
Mobile phase temperature: 30° C.
UV wavelength: 245 nm.
Columns used: three PSS SVD Lux analytical columns (styrene-divinylbenzene copolymer network), columns having as stationary phase beads of diameter 5 μm and pore sizes of 1000 A, 100,000 A, and 1,000,000 A, and guard columns.
Flow rate: 1 mL/min.
GPC system: waters HPLC alliance e2695 system with UV and RI detectors
MALS system: The DAWN HELEOS 8 system with 8 detectors operating a laser at 664.5 nm.

The chromatograms are depicted in FIG. 1. The diblock copolymer 2 eluted earlier than homopolymer 1 since it had a higher molecular weight.

EXAMPLE 8

This example illustrates a method of preparing a porous membrane from the diblock copolymer in accordance with an embodiment of the invention.

A casting solution containing the diblock copolymer from Example 6 was prepared by mixing the diblock copolymer with DMF and THF until a clear solution was obtained. The solution contained the diblock copolymer, DMF, and THF at a ratio of 15:51:34 mass %.

A thin film was cast on a glass plate from the above polymer solution using a casting knife with a gap adjusted to provide 7-8 mil (or about 177-200 microns) thick wet membrane. The film was allowed to stand for a period of 90 sec to allow it to develop a self-assembled nanostructure, subsequent to which, it was immersed in a coagulation bath containing isopropanol for a period of 1 hr. The film was washed and dried, and then imaged with a Field Emission SEM to reveal its nanostructure.

Figure 3:
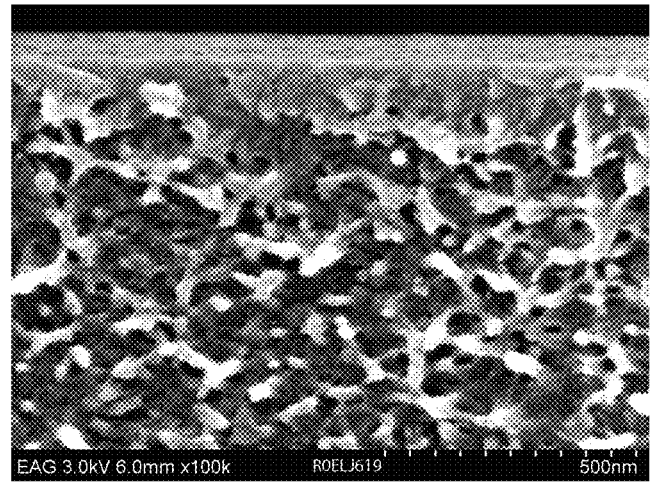
FIG. 3 depicts a Field Emission Scanning Electron Micrograph (FE-SEM) image of the cross-section of a porous membrane prepared in accordance with an embodiment of the invention.

FIG. 3 depicts the FE-SEM cross-sectional image of the porous membrane including the air interface of the membrane.

Figure 4:
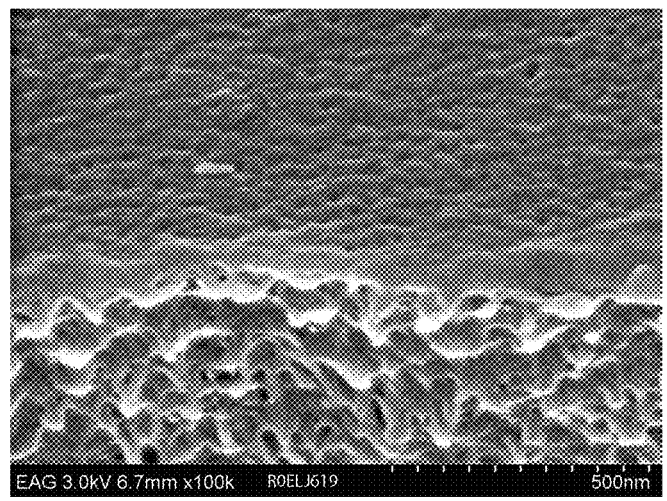
FIG. 4 depicts the FE-SEM perspective image of the membrane depicted in FIG. 3 showing both the top surface and the cross-section.

FIG. 4 depicts the FE-SEM perspective image showing both the surface and the cross-section of the membrane depicted in FIG. 3.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A diblock copolymer of the formula (I):

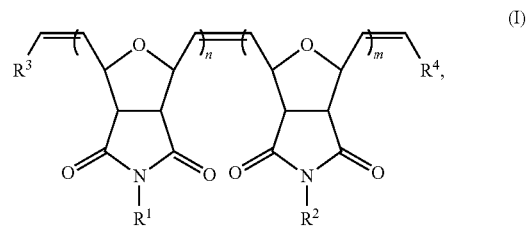

wherein:

R$^1$ is a C$_6$-C$_{22}$ alkyl group optionally substituted with a substituent selected from halo, alkoxy, alkylcarbonyl, alkoxycarbonyl, amido, or nitro, or a C$_3$-C$_{11}$ cycloalkyl group, optionally substituted with a substituent selected from alkyl, halo, alkoxy, alkylcarbonyl, alkoxycarbonyl, amido, or nitro;

R$^2$ is a C$_6$-C$_{20}$ aryl group or a heteroaryl group, optionally substituted with a substituent selected from hydroxy, amino, halo, alkoxy, alkylcarbonyl, alkoxycarbonyl, amido, or nitro;

one of R$^3$ and R$^4$ is a C$_6$-C$_{14}$ aryl group, optionally substituted with a substituent selected from hydroxy, halo, amino, or nitro, and the other of R$^3$ and R$^4$ is a C$_1$-C$_{22}$ alkoxy group, optionally substituted with a substituent selected from carboxy, amino, mercapto, alkynyl, alkenyl, halo, azido, and heterocyclyl; and n and m are independently 2 to about 2000.

2. The diblock copolymer of claim 1, wherein R$^1$ is a C$_6$-C$_{20}$ alkyl group, optionally substituted with a substituent selected from halo, alkoxy, alkylcarbonyl, alkoxycarbonyl, amido, or nitro.

3. The diblock copolymer of claim 1, wherein R$^1$ is a C$_{10}$-C$_{18}$ alkyl group, optionally substituted with a substituent selected from halo, alkoxy, alkylcarbonyl, alkoxycarbonyl, amido, or nitro.

4. The diblock copolymer of claim 1, wherein R$^1$ is a C$_{16}$ alkyl group.

5. The diblock copolymer of claim 1, wherein R$^2$ is a C$_6$-C$_{10}$ aryl group, optionally substituted with a substituent selected from hydroxy, amino, halo, alkoxy, alkylcarbonyl, alkoxycarbonyl, amido, or nitro.

6. The diblock copolymer of claim 1, wherein R$^2$ is a phenyl group, optionally substituted with a substituent selected from hydroxy, amino, halo, alkoxy, alkylcarbonyl, alkoxycarbonyl, amido, or nitro.

7. The diblock copolymer of claim 1, wherein R$^2$ is phenyl.

8. The diblock copolymer of claim 1, wherein R$^3$ is phenyl.

9. The diblock copolymer of claim 1, wherein R$^4$ is a C$_1$-C$_6$ alkoxy group.

10. The diblock copolymer of claim 1, wherein n is about 10 to about 200 and m is about 50 to about 2000.

11. The diblock copolymer of claim 1, wherein n is about 83 to about 190 and m is about 675 to about 1525.

12. The diblock copolymer of claim 1, which has the following structure:

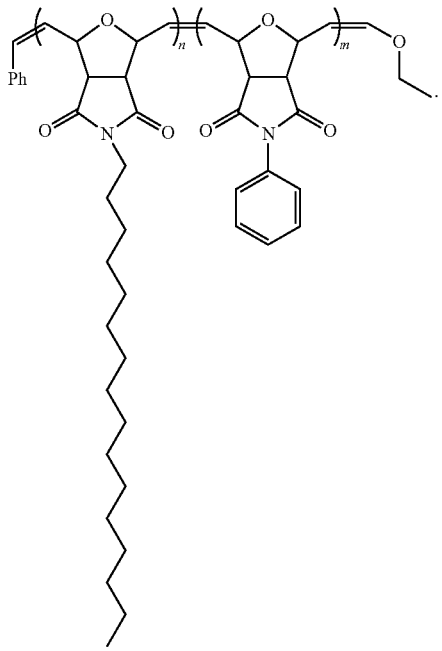

13. A porous membrane comprising a diblock copolymer of claim 1.

14. A porous membrane comprising a diblock copolymer of claim 12.

15. A method of preparing a diblock copolymer of claim 1, comprising:

(i) polymerizing one of the two monomers of the formulas:

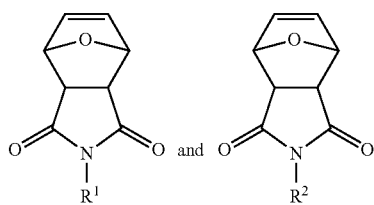

with a ring opening metathesis polymerization (ROMP) catalyst to obtain a ring-opened polymer having a living chain end;

(ii) polymerizing the other of the two monomers on the living end of the ring-opened polymer obtained in (i) to obtain a diblock copolymer having a living end; and (iii) terminating the living end of the diblock copolymer obtained in (ii) with an optionally substituted alkyl vinyl ether.

16. The method of claim 15, wherein the ROMP catalyst is of the formula:

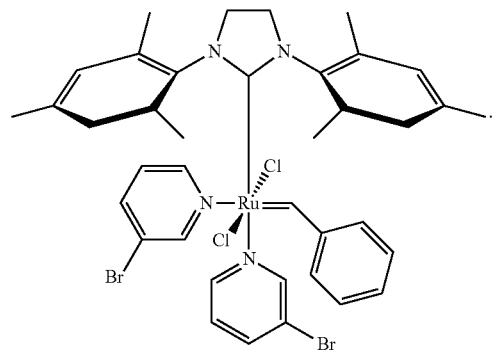

17. A diblock copolymer of the formula (I):

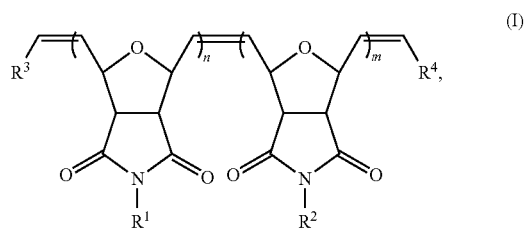

wherein:

$R^1$ is a $C_1$-$C_{22}$ alkyl group optionally substituted with a substituent selected from alkoxy, alkylcarbonyl, alkoxycarbonyl, amido, or nitro, or a $C_3$-$C_{11}$ cycloalkyl group, optionally substituted with a substituent selected from alkyl, halo, alkoxy, alkylcarbonyl, alkoxycarbonyl, amido, or nitro;

$R^2$ is a $C_6$-$C_{20}$ aryl group or a heteroaryl group, optionally substituted with a substituent selected from hydroxy, amino, alkoxy, alkylcarbonyl, alkoxycarbonyl, amido, or nitro;

one of $R^3$ and $R^4$ is a $C_6$-$C_{14}$ aryl group, optionally substituted with a substituent selected from hydroxy, halo, amino, or nitro, and the other of $R^3$ and $R^4$ is a $C_1$-$C_{22}$ alkoxy group, optionally substituted with a substituent selected from carboxy, amino, mercapto, alkynyl, alkenyl, halo, azido, and heterocyclyl; and n and m are independently 2 to about 2000.

18. A porous membrane comprising a diblock copolymer of claim 17.

19. A method of preparing the diblock copolymer of claim 17, comprising:

(i) polymerizing one of the two monomers of the formulas:

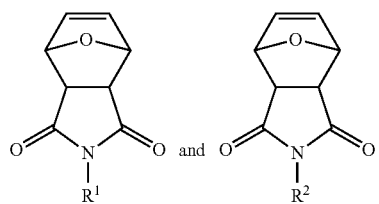

with a ring opening metathesis polymerization (ROMP) catalyst to obtain a ring-opened polymer having a living chain end;

(ii) polymerizing the other of the two monomers on the living end of the ring-opened polymer obtained in (i) to obtain a diblock copolymer having a living end; and (iii) terminating the living end of the diblock copolymer obtained in (ii) with an optionally substituted alkyl vinyl ether.

20. A method of preparing a diblock copolymer of the formula (I):

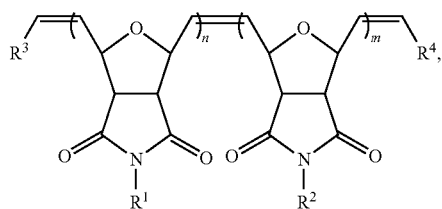

(I)

wherein:

$R^1$ is a $C_1$-$C_{22}$ alkyl group optionally substituted with a substituent selected from halo, alkoxy, alkylcarbonyl, alkoxycarbonyl, amido, or nitro, or a $C_3$-$C_{11}$ cycloalkyl group, optionally substituted with a substituent selected from alkyl, halo, alkoxy, alkylcarbonyl, alkoxycarbonyl, amido, or nitro;

$R^2$ is a $C_6$-$C_{20}$ aryl group or a heteroaryl group, optionally substituted with a substituent selected from hydroxy, amino, halo, alkoxy, alkylcarbonyl, alkoxycarbonyl, amido, or nitro;

one of $R^3$ and $R^4$ is a $C_6$-$C_{14}$ aryl group, optionally substituted with a substituent selected from hydroxy, halo, amino, or nitro, and the other of $R^3$ and $R^4$ is a $C_1$-$C_{22}$ alkoxy group, optionally substituted with a substituent selected from carboxy, amino, mercapto, alkynyl, alkenyl, halo, azido, and heterocyclyl; and n and m are independently 2 to about 2000, comprising:

(i) polymerizing one of the two monomers of the formulas:

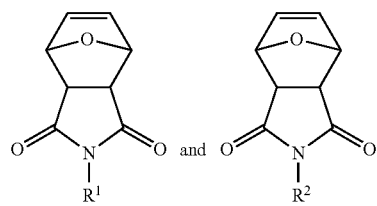

with a ring opening metathesis polymerization (ROMP) catalyst to obtain a ring-opened polymer having a living chain end;

(ii) polymerizing the other of the two monomers on the living end of the ring-opened polymer obtained in (i) to obtain a diblock copolymer having a living end; and (iii) terminating the living end of the diblock copolymer obtained in (ii) with an optionally substituted alkyl vinyl ether;

wherein the ROMP catalyst is of the formula:

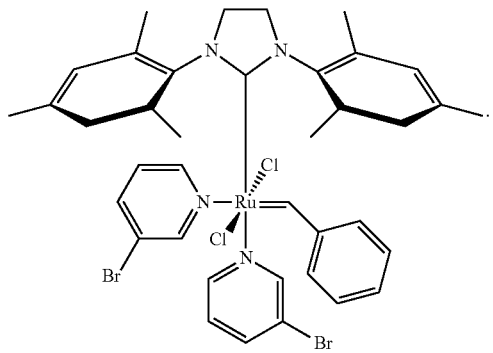

* * * * *